US009100247B2

(12) United States Patent
Grover

(10) Patent No.: US 9,100,247 B2
(45) Date of Patent: *Aug. 4, 2015

(54) DISTRIBUTED SYNCHRONOUS BATCH RECONFIGURATION OF A NETWORK

(71) Applicant: TR Technologies Inc., Edmonton (CA)

(72) Inventor: Wayne D. Grover, Edmonton (CA)

(73) Assignee: TR Technologies Inc., Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/860,478

(22) Filed: Apr. 10, 2013

(65) Prior Publication Data

US 2013/0326073 A1 Dec. 5, 2013

Related U.S. Application Data

(63) Continuation of application No. 12/054,342, filed on Mar. 24, 2008, now Pat. No. 8,437,280.

(60) Provisional application No. 60/896,388, filed on Mar. 22, 2007.

(51) Int. Cl.
*G06F 13/42* (2006.01)
*H04L 29/08* (2006.01)
(Continued)

(52) U.S. Cl.
CPC .......... *H04L 29/0836* (2013.01); *H04L 41/024* (2013.01); *H04L 45/02* (2013.01); *H04L 45/50* (2013.01); *H04L 45/62* (2013.01);
(Continued)

(58) Field of Classification Search
CPC ..... H04L 29/0836; H04L 45/62; H04L 45/50; H04L 41/024; H04L 45/02; H04L 67/1095; H04L 67/14; H04L 41/12

USPC .......................................................... 370/254
See application file for complete search history.

(56) References Cited

U.S. PATENT DOCUMENTS 5,425,019 A 6/1995 Chugo
5,475,717 A 12/1995 Cordonnier
(Continued)

OTHER PUBLICATIONS

Briun, X.M., "Mechanisms to Reduce Routing Information Inaccuracy Effects: Application to MPLS and WDM Networks", PhD. Thesis, Universitat Politécnica de Catalunya, 54 pages, 2003.
(Continued)

*Primary Examiner* — Jay P Patel
(74) *Attorney, Agent, or Firm* — Christensen O'Connor Johnson Kindness PLLC

(57) ABSTRACT

A novel alternative concept for handling dynamic provisioning changes and ongoing network reconfiguration and incremental reoptimization in general. A prime motivation is concern about the dependency of existing concepts for dynamic provisioning on the real-time coherence of databases of network state at diverse geographic locations. Not only is the continual updating of such global state everywhere in the network an intensive real-time load, but inevitable incoherencies pose hazards in network operation. The alternative proposal is a framework that makes use precise time synchronization and the computational power of network nodes to solve identical local instances of incremental reoptimization problems in situ. The new scheme removes the database coherency hazard, reduces signaling volumes, and increases resource efficiencies in service provisioning. It also provides a framework in general for continually ongoing incremental or (if desired) total reoptimization of network configuration.

19 Claims, 11 Drawing Sheets

(51) Int. Cl.
    *H04L 12/24* (2006.01)
    *H04L 12/751* (2013.01)
    *H04L 12/723* (2013.01)
    *H04L 12/721* (2013.01)

(52) U.S. Cl.
    CPC ............ *H04L 41/12* (2013.01); *H04L 67/1095* (2013.01); *H04L 67/14* (2013.01)

(56) References Cited

U.S. PATENT DOCUMENTS

| | | | | |
|---|---|---|---|---|
| 6,129,274 | A | * | 10/2000 | Suzuki ............ 235/381 |
| 6,510,141 | B1 | * | 1/2003 | Ramfelt et al. ............ 370/254 |
| 6,876,625 | B1 | * | 4/2005 | McAllister et al. ............ 370/221 |
| 7,159,035 | B2 | | 1/2007 | Garcia-Luna-Aceves |
| 7,184,421 | B1 | * | 2/2007 | Liu et al. ............ 370/338 |
| 7,251,222 | B2 | | 7/2007 | Chen |
| 7,251,489 | B2 | | 7/2007 | Beasley |
| 7,406,167 | B2 | | 7/2008 | Ooki |
| 7,577,103 | B2 | | 8/2009 | Diaz |
| 7,688,862 | B2 | | 3/2010 | Wisler |
| 7,693,976 | B2 | | 4/2010 | Perry |
| 7,729,285 | B2 | | 6/2010 | Yoon |
| 7,904,087 | B2 | | 3/2011 | Zhang |
| 8,364,758 | B2 | * | 1/2013 | Hydrie et al. ............ 709/204 |
| 8,437,280 | B2 | | 5/2013 | Grover |
| 2001/0037398 | A1 | | 11/2001 | Chao |
| 2004/0095900 | A1 | | 5/2004 | Siegel |
| 2004/0100969 | A1 | | 5/2004 | Sankar |
| 2005/0108576 | A1 | | 5/2005 | Munshi |
| 2005/0117573 | A1 | | 6/2005 | Konda |
| 2005/0124345 | A1 | | 6/2005 | Laroia |
| 2005/0174950 | A1 | * | 8/2005 | Ayyagari ............ 370/254 |
| 2005/0265255 | A1 | * | 12/2005 | Kodialam et al. ............ 370/252 |
| 2005/0265258 | A1 | * | 12/2005 | Kodialam et al. ............ 370/254 |
| 2006/0072735 | A1 | | 4/2006 | Shell |
| 2006/0165085 | A1 | | 7/2006 | Konda |
| 2006/0287994 | A1 | | 12/2006 | George |
| 2007/0002759 | A1 | | 1/2007 | Diaz |
| 2008/0043635 | A1 | | 2/2008 | Retana |
| 2008/0263031 | A1 | | 10/2008 | George |

OTHER PUBLICATIONS

Doucette, J., et al., "On the Availability and Capacity Requirements of Shared Backup Path-Protected Mesh Networks", SPIE Optical Networks Magazine, 4(6):29-44, 2003.

Fischer, M.J., et al., "Impossibility of Distributed Consensus with One Faulty Process," Journal of the ACM (JACM), 32(2):374-382, Apr. 1985.

Kuri J., "WDM Optical Transport Networks with Scheduled Lightpath Demands," Ph. D. Thesis Dept. Computer Science and Networks, ENST, France Sep. 2003, 165 pages.

Pandi Z., and L. Wosinska, "On Temporary Inconsistency of the Link State Database with Prompt Update Policies," Proceedings ICTON 2005, Barcelona, 2005, paper TuC3.6, pp. 437-440.

* cited by examiner

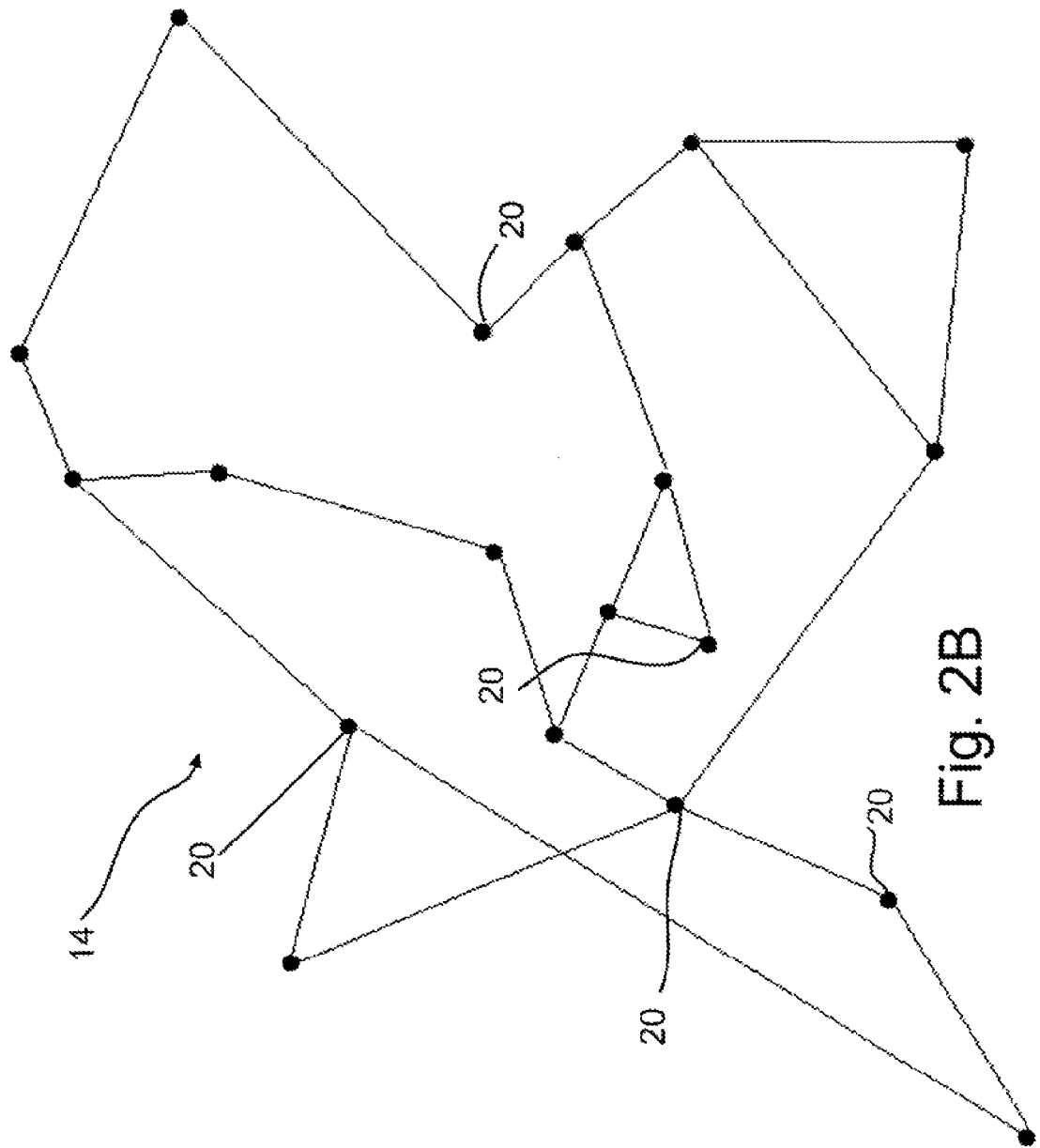

DISTRIBUTED SYNCHRONOUS BATCH RECONFIGURATION OF A NETWORK

CROSS-REFERENCE TO RELATED APPLICATIONS

This application is a continuation of U.S. application Ser. No. 12/054,342, filed Mar. 24, 2008, which claims the benefit of U.S. Provisional Application No. 60/896,388 filed Mar. 22, 2007, all of which are incorporated by reference herein in their entirety.

BACKGROUND

Present concepts for dynamic operation of transport networks are based either on a presumption of complete centralized control, or on distributed path provisioning operations undertaken independently and asynchronous by end-nodes, relying on local copies of global network state which are synchronized network-wide by "TE" ("traffic engineering") type link-state updates broadcast from each node as it effects changes. The disadvantages of completely centralized control lie mainly in single-point vulnerability, signaling volumes, and scalability and are well recognized. The fully distributed peer-to-peer alternative avoids some of these drawbacks, and generally seems to be the only approach assumed for operating a dynamic survivable optical transport network.

In the view of some, however, a significant but almost always ignored issue the prospective automated WDM (or MPLS) networks have to face is hazards from network state information inconsistency, especially as network diameter increases and/or the time-scale of connections request arrivals and departures decreases. In the current thinking for such networks, connection admission control and network resource allocation functions are implemented independently at each node in a network for connections originating/terminating at that node. While this removes vulnerabilities of having a single control center and telemetry to/from that center from all network nodes, its own peer-to-peer real-time signaling intensity still grows at least as $O(\lambda n^2)$ where n is the number of nodes in the network and $\lambda$ is the arrival rate of connection requests at each node. And the database of network state, including tracking the routes of all paths in service and spare channel sharing relationships on backup paths could be growing as $O(\lambda h n^4)$ where h is the average holding time of (protected) connections. As computational complexity arguments go, these are not extremely high growth rates for a standalone computational problems and/or database sizes, but it is hard to see why this is so often considered "scalable" in the context of a continental-scale transport network where all such signaling and database coherence is actually time-critical and mission critical because correct ongoing operation of the network relies on maintaining a globally coherent database of network state in all nodes.

In simple language, the hazard exists under asynchronous distributed provisioning because some nodes are making changes to the common state information, acting on it, and making more changes based on it. Intuitively we can see that sooner or later this will lead to problems of almost unpredictable severity. But more theoretically that intuition is confirmed in the Fischer, Lynch, Paterson theorem which states:

"The consensus problem involves an asynchronous system of processes, some of which may be unreliable. The problem is for the reliable processes to agree on a binary value. It is shown that every protocol has the possibility of non-termination, even with only one faulty process. By way of contrast, solutions are known for the synchronous case, the "Byzantine Generals" problem" (M. J. Fischer et al, "Impossibility of Distributed Consensus with One Faulty Process", Journal of the ACM, Vol. 32, Issue 2, April 1985, p. 374-382)

Although the FLP theorem uses formal language, it tells us that if the processes involved cannot be relied upon to hold a constant value while the consensus is being attempted, a stable outcome may never be reached. But this is what engineers already know in digital logic design. We clock our logic circuits so that at significant time instants all states are frozen, allowing for propagation time through combinatorial circuits, and time for differential delays and rise/fall transition times, and so on, so that at the next clock instant, an assured correct next-state is adopted throughout the entire circuit. The hazard exists only if there is no coordination of the times at which changes and actions will be allowed and not allowed by nodes. Thus, if time synchronization is effected, we could make an entire network operate with the stability of a large clocked digital logic circuit. Thus, the role of the FLP theorem here is to explain why asynchronous operation is not assured. But conversely, it lets us see that synchronous operation can be robust in this regard—it is because no one will be trying to make changes while others are acting on the same information. In the following scheme, the equivalent of consensus can be reached because data is exchanged only during a time phase when all nodes are in agreement to temporarily not make any more changes to the data.

In the context of an optical transport network, one relatively benign outcome of temporary state inconsistency occurs if a resource is incorrectly considered not available. Then the connection admission control algorithm running at a node may reject a connection that could, in fact, have been admitted at the moment. This affects only the single connection request, however. On the other hand, if a particular resource is marked as available in the network state database of a node while it is already not available in reality, then connections may be admitted without enough resources in the network to serve them. This will usually lead to a failure of one or more conflicting path forming signaling attempts following the locally determined route choices. Normally, this too will not be a severe problem. Crank-back protocols will release the resources of the failed, but partially formed paths, and again update network state globally. End nodes may then re-attempt.

If one contemplates seriously that such networks are to (one day) operate dynamically, independently, for, say, thousands of connections a minutes, hour after hour, 24/7 for months and years, then one must be concerned about the possible outcomes of randomly arising interactions of effects from state inconsistency. It is possible to conceive worst-case event sequences that lead to the meltdown of the entire network because of repeated interacting resource allocation failures and runaway crank-back and state updating dynamics in addition to loss of network state needed to correctly activate protection arrangements. Any one such scenario may be individually improbable but one is running the experiment very often over a very long time. The interactions that led to collapse of the AT&T switching network some years were extremely improbable.

Many Internet problems are also typically understood to arise from combinations of signaling and state-update interactions. Each exact sequence of interactions that leads to a brown-out or collapse is individually very improbable, but at the large scale, happen all to often. It is not possible to give an a priori proof that a serious crash of a network will arise within so much time, given so and so size and frequency of provisioning action. Rather, the point is made for us by real-world experience with crashes in systems involving numerous asynchronously acting processes and events for which correct operation relies on the real-time coherency of a common state database. Many measures can be thought of within the existing peer-to-peer framework to reduce the likelihood of such adverse complex interactions, but no such accumulation of measures guarantees that Murphy's Law wont eventually prevail.

Ultimately, however, to motivate what follows, we do not think a reader needs to be convinces that such crashes are certain or will be noticeably frequent, only that the risk logically exists within that framework. This sets the stage for, our present thesis which is to at least propose and explain an alternate framework which is free of the hazard altogether, and provides other advantages as well.

Prior research that explicitly addresses the risk that is posed has been targeted at essentially two types of workaround so far. The first is to propose connection admission mechanisms that tolerate the inaccuracy of the network state information and alleviate its impact at the price of increased connection blocking. The second one is to drop the idea of distributed operation by introducing a central entity in charge of connection admission decisions. The latter is obviously less robust as the critical point of the system is the central entity, whose substitution may entail additional problems in case of a failure. A review of related work is presented in Zsolt Pandi, Lena Wosinska, "On temporary inconsistency of the link stata database with prompt update policies," Proceedings ICTON 2005, Barcelona, 2005, paper TuC3.6, pp. 437-440.

Other researchers working on similar problems have recognized practical and cost-effective advantages of scheduled or batch paradigms for provisioning (Joshua Kuri, "WDM Optical Transport Networks with Scheduled Light Path Demands," PhD Thesis, Dept. Computer Science and Networks, ENST, France Sept. 2003 (and related publications by the same group).

SUMMARY

An alternative method, in one embodiment, which is hazard-free, and introduces the ability to operate with globally optimal solutions to network reconfiguration problems involves, as illustrated in the following, batched provisioning of change actions among participating nodes. The method allows for an absolutely robust confirmation of global state database coherence before any reliance upon it for network actions. The method may further use globally optimal reconfiguration solutions, while nodes act locally to put into effect their parts only of globally optimal reconfiguration plans.

Thus, a method of configuring connections of a node in a telecommunications network with participating nodes of the telecommunications network is disclosed. A change list is accumulated at the node, the change list comprising connection requests received at the node. The change list is then disseminated to the participating nodes of the network. The node receives change lists from each of the participating nodes, the change list of each participating node comprising connection requests accumulated at the respective participating node. A solution for configuring connections to provide channels at the node is computed. The solution takes into account at least part of the change list accumulated at the node, including the connection requests accumulated at the node, and at least part of each of the change lists accumulated at the participating nodes, including connection requests accumulated at the participating nodes. At least a part of the computed solution is then implemented at the node. The channels may include working channels and protections channels. The change list may also include departures recorded at the node.

These and other aspects of the method are set out in the claims, which are incorporated here by reference.

BRIEF DESCRIPTION OF THE FIGURES

There will now be described embodiments of a batch distributed provisioning scheme for a network, with reference to the drawings by way of example, in which:

FIG. 2B illustrates a modified (low degree) EU network topology used in the experiments.

DETAILED DESCRIPTION

Figure 1:
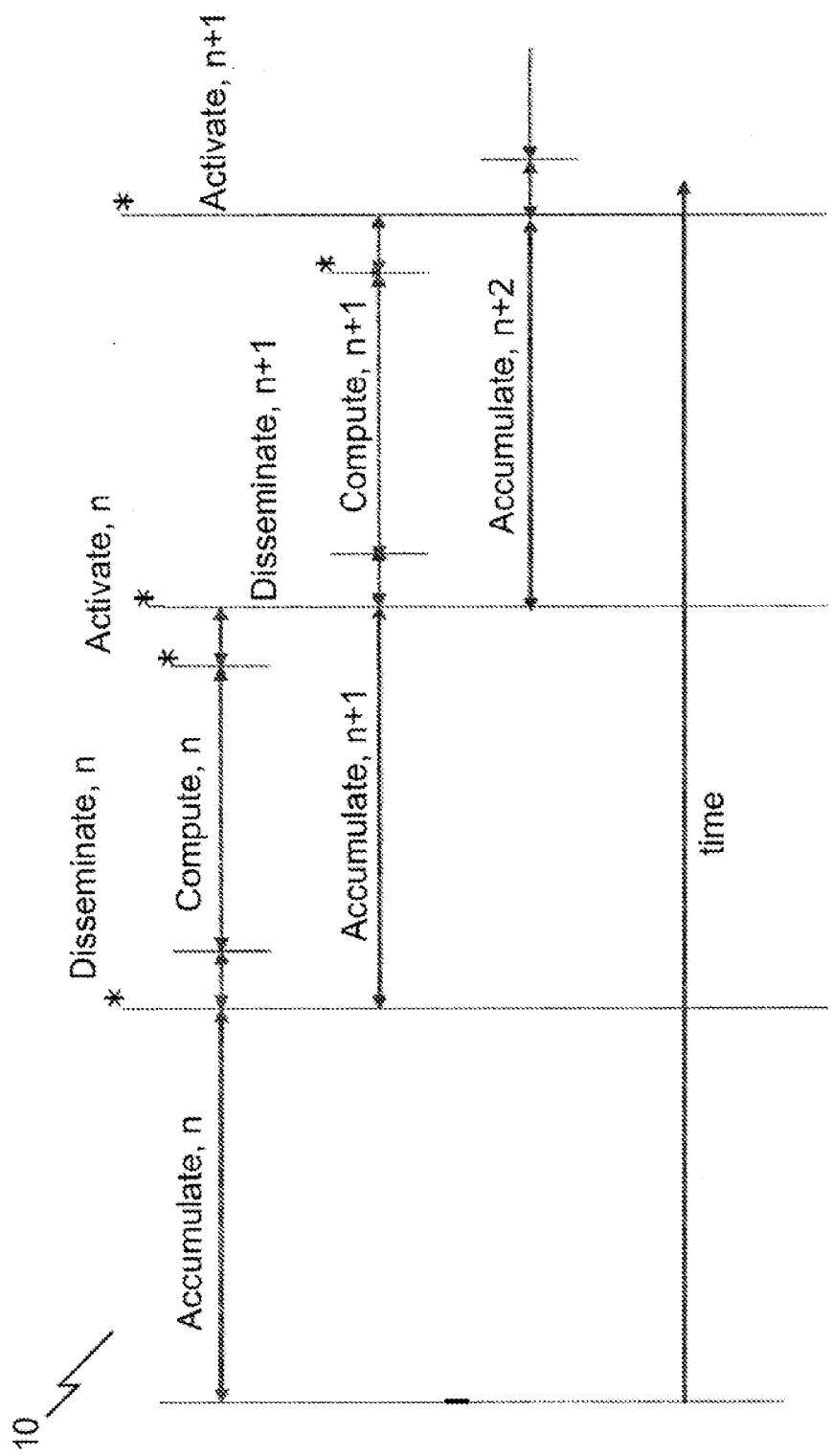
FIG. 1 illustrates an operational cycle of a distributed synchronous batch provisioning scheme (* denotes precise-time instants).

With reference to FIG. 1, the proposed method 10 according to an embodiment includes the following steps:

Accumulate: nodes make provisioning requests by batches via the synchronous execution of an accumulation step, during which incoming provisional requests are recorded;

Disseminate: nodes apply a synchronization step, during which all participating nodes are made aware of those provisioning requests pending at other nodes;

Compute: nodes apply an optimization step, in which all participating nodes compute an identical new network state; and Activate (implement): nodes apply an activation step, in which the network nodes materialize the new network state.

As shown in FIG. 1, subsequent re-iterations of the method 10 may overlap. The node may accumulate elements of a change list such as provisioning requests and departures while carrying out other steps such as dissemination, computation and implementation.

Figure 1A:
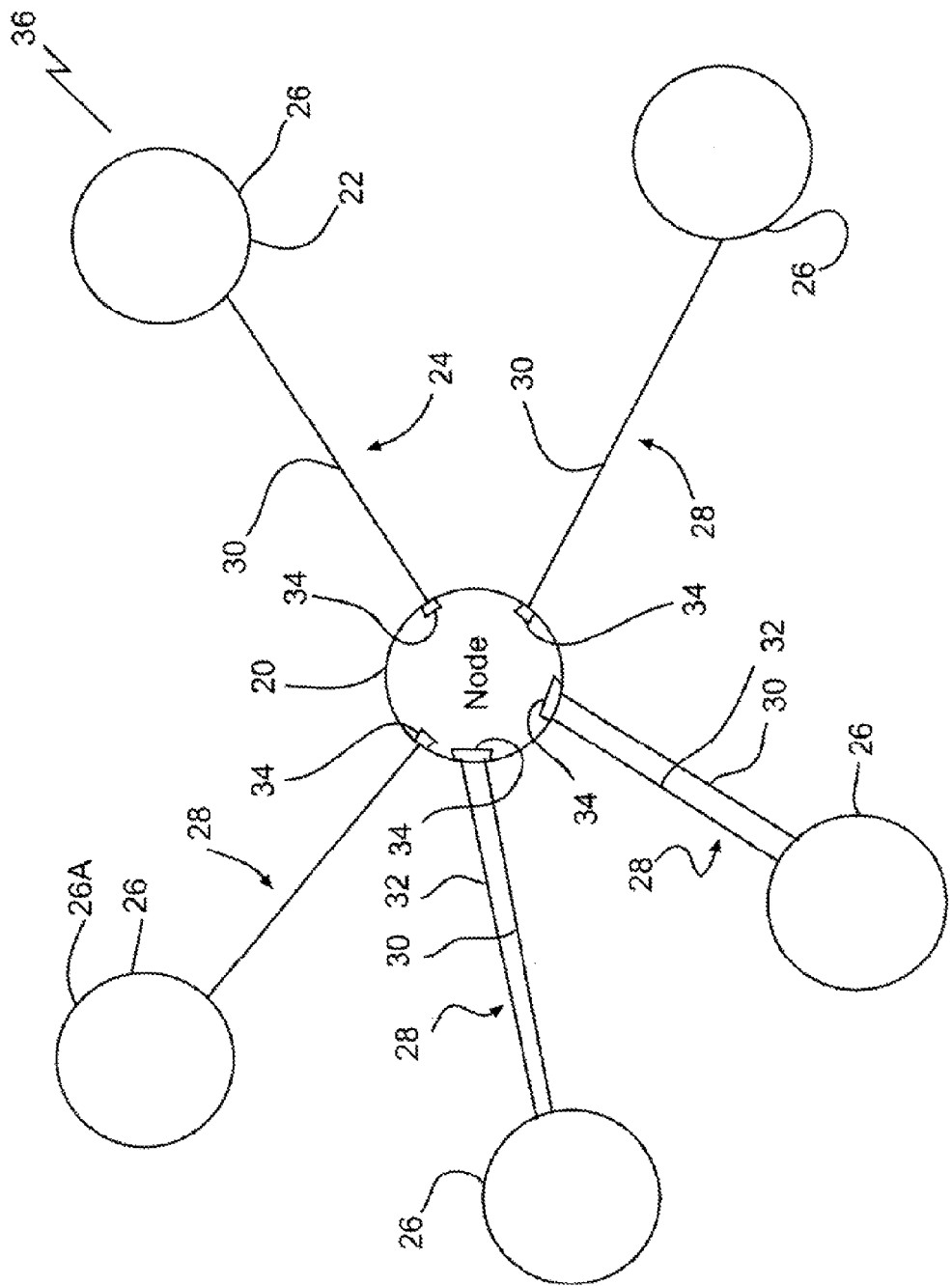
FIG. 1A illustrates an exemplary node.

Referring to FIG. 1A, an exemplary node 20 is illustrated. Node 20 may be linked to at least a source node 22 via link 24. In the embodiment illustrated in FIG. 1A, node 20 is also linked to a plurality of participating nodes 26, via links 28. It should be understood that node 20 may be linked to any number of other nodes, and need not be directly linked to a sink or source node. One of the participating nodes 26 may be, for example, a sink node 26A. In addition, the source node 22 may be another participating node 26. Any one of links 24 and 28 may include, for example, any number of working channels 30 and/or protection channels 32. Node 20 is able to link with any of participating nodes 26 and source node 22 through, for example, a plurality of ports 34. Access ports 34 may be opened upon receipt of a connection request. A connection is symbolized in FIG. 1A by the presence of the links between a pair of nodes. The configuration of nodes and how to make connection requests is known, and will not be discussed in detail here. For the purposes of the methods discussed herein, any one of the participating nodes is understood to operate under the same general principles and functions as node 20. Node 20 is understood to represent any node in a telecommunications network 36. The network may span the globe, or may be more limited in extent. The principles described here do not depend on the size of the network. Furthermore, any reference to a node in this document may refer to either of nodes 20, 22, or 26. A node may also correspond to a domain, which is a group of nodes. The theory and function of nodes and networks are well-understood and need not be described in detail here.

Batching: In this approach, new connection requests, especially for transport-level paths (OCn's or lightpaths) do not have to be provided instantaneously. The delay most users of this network can tolerate between connection request and setup is assumed to be in the range of minutes at least, particularly for demands for a light path that may convey 10 Gb/s and cost thousands of dollars to use. Such a delay compares well considering that it can easily take 10 s or more to establish an "on-demand" long distance phone call. Even in the most automated context of a router seeing increasing load, and "dialing up" an additional lightpath from the transport layer, the router makes such a request on the basis of an observed trend, slightly before the added capacity is fully needed, allowing for a short operational provisioning delay.

Time Synchronization: This scheme also exploits precise time synchronization amongst nodes involved in the provisioning of new service paths. Time synchronization already exists in today's transport networks, but a new and additional use is made of this asset. Nodes have access to "precise time" and frequency because it is needed for SONET network synchronization, and prior to that, for slip-free digital PCM switching. A high level of absolute clock time synchronization is already in existence in the nodes of the intended transport networks using GPS receivers and/or terrestrial based precise-time synch procedures in conjunction with atomic frequency standards (such as Cesium or rubidium oscillators). Thus, all provisioning-enabled nodes can participate in network-time synchronization. With precise time as a common asset, the set of network nodes operating under this scheme observe a repeating definition of time steps. Existing technology and performance levels of precise time synchronization are well known from texts such as *Synchronization of Digital Telecommunications Networks*, by Stefano Bregni, John Wiley and Sons, 2002. Depending on the time scale of averaging, time precision countable in nanoseconds of difference between network clocks and the national atomic reference standard may be achieved. The precise-time asset common to multiple nodes is applied here in a new use.

Following now is an overview of operation of an embodiment of the new scheme. Using the common time synchronization in participating nodes, the nodes synchronously conduct the phases of accumulate, disseminate, compute and implement. Conceptually, to illustrate, assume that a network re-optimization and reprovisioning interval of 10 minutes is chosen. Then the first phase could be defined as starting on every $10^{th}$ minute of the hour (or any other arbitrary, but common, clock-time that is desired).

Figure 8:
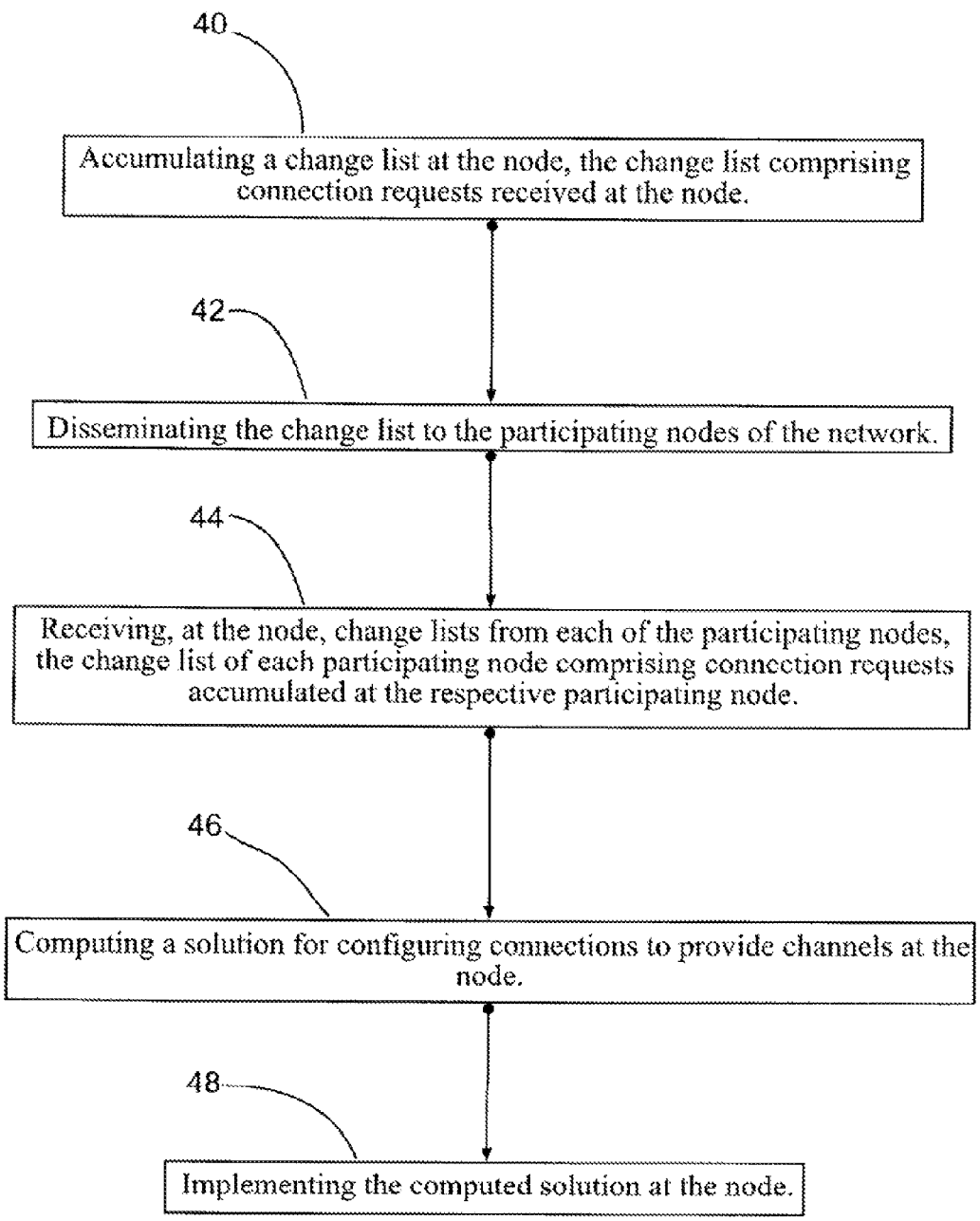
FIG. 8 illustrates a method of configuring connections of a node in a telecommunications network with participating nodes of the telecommunications network using change lists comprising connection requests.
Figure 9:
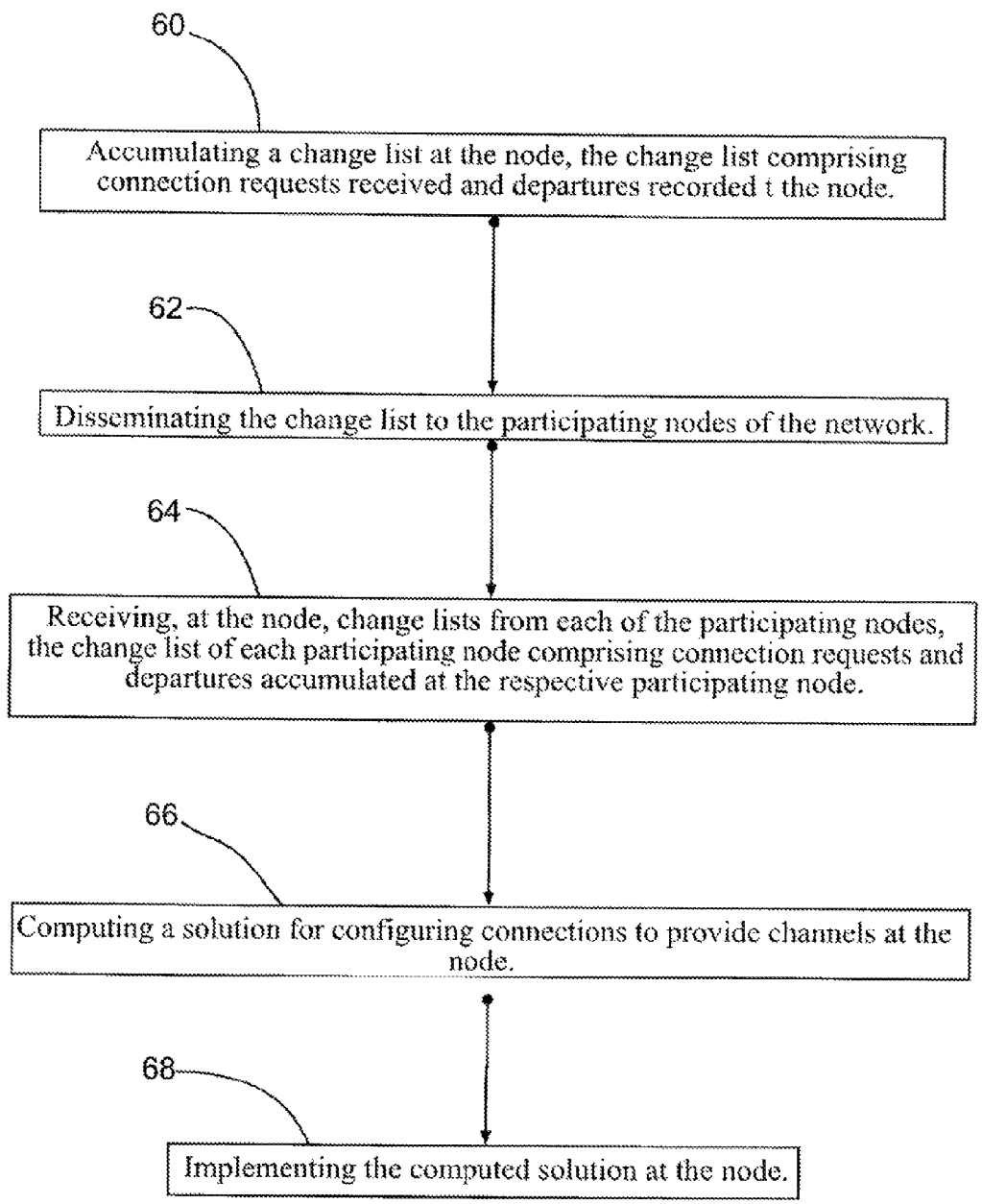
FIG. 9 illustrates a method of configuring connections of a node in a telecommunications network with participating nodes of the telecommunications network using change lists comprising connection requests and departures recorded.

Phase 1: (Accumulate Change Requests) In an embodiment, during at least part of a first accumulate phase no provisioning operations or changes are made. The existing state of all connections in progress in the network is retained but new connection requests are accumulated as they arrive at each provisioning access node. Referring to FIG. 8, in step 40, at the individual node level, a change list is accumulated at the node 20, the change list comprising connection requests received at the node 20. Departures may also be recorded and accepted at any time. Referring to FIG. 9, this is illustrated in step 60 at the individual node level, where a change list is accumulated at the node, the change list comprising connection requests received and departures recorded at the node. This phase lasts for a predefined period, $\delta$. A reasonable range for the values of $\delta$ is, for example, from a few seconds to perhaps minutes. More generally, it would be set in relation to the average inter-arrival time of new connection requests experienced by the network. Phase 1 may end synchronously and precisely at a predefined time at all nodes of the network (i.e., within limits of the time synchronization accuracy each node ends this phase independently at its site at the "same" corresponding instant.) Based on existing network time synchronization performance this means typically that in this embodiment all participating nodes may end this phase globally within about a microsecond or less of each other, ending the request recording phase (phase 1) at its site. The term "all nodes" used here is a reference to the set of nodes participating in the global operational scheme that is being described. This need not be the set of all nodes in the network. Similarly "each node" refers to an action taking place individually at one the participating nodes, such as node 20 as illustrated in FIG. 1A. In some embodiments, each node closes the request recording phase to within the sub-microsecond accuracy provided by network precise time. At each node phase 2 is entered with respect to the provisioning requests accumulated in that interval and a new accumulation period may begin immediately.

Phase 2: (Share Change Requests) In the next phase the nodes create a data packet which summarizes the list of the accumulated new connection requests (which may for example include other information such as the class of protection requested) and departures which they recorded in the preceding accumulation phase. Referring to the method illustrated in FIGS. 8 and 9, this data packet comprises a change list. This packet can be invested with any number of existing already-known error-checking and/or correction encoding methods. The error-protected change summary packet from each node is disseminated to all other nodes and each node receives such "change list" packets from all other nodes.

Referring to FIGS. 8 and 9, this dissemination step is illustrated in steps 42 and 62, respectively. The change list is disseminated to the participating nodes of the network by standard packet mechanisms, similar to link-state advertisements (or updates) in ordinary Internet operation. Referring to FIG. 8, reception is illustrated in step 44 at the node level, as the node 20 receives change lists from each of the participating nodes 26, the change list of each participating node 26 comprising connection requests accumulated at the respective participating node. Referring to FIG. 9, a step 64 analogous to step 44 of FIG. 8 is illustrated, as the node receives change lists from each of the participating nodes, the change list of each participating node comprising connection requests and departures accumulated at the respective participating node.

Importantly, however, the dissemination and exchange of data between nodes that occurs in this scheme is a completely non-time-critical process, and has the luxury of employing any number of well-known methods needed to ensure correct mutual data exchange amongst all nodes before ever proceeding to act on the data. For example, measures such as checksums, forward error correction, repeated transmission, or packet retransmission with acknowledgement protocols are all known methods that can be applied at this phase.

By whatever of these means is used in the implementation the end result is that each node has locally an identical copy of the global list of all new connections and departures that arose at every other node in the preceding first time phase. The philosophy is that although this is a critical information exchange, it is not under any real-time pressure, so the robustness of this process can be made arbitrarily reliable. Moreover, unless there is a positive global confirmation of correct update data synchronization, there is no need to act. Further, in an embodiment, the integrity of the mutual data-exchange process can now be further ascertained by a global flooding exchange of an integrity measure such as a checksum value on the aggregate of all disseminated change packets. i.e., this confirms that every node has received the identical global set of change requests seen by every other node. That is, each node integrates the change packages received from other participating nodes in a single network wide summary of the change requirements, and each node emits a global change summary checksum. If even one "mismatched" checksum value is "heard" by nodes listening to the flooding confirmation for correct mutual data synchronization, all nodes can be "waived off" from the next phase, avoiding any need to act on the possibly uncertain global state data. Note in contrast that this is essentially the hazard that the existing schemes face and are unable to avoid. Waive off in this context means not implementing connection changes, and may also include omitting the compute step that would follow in a particular single iteration of the method steps.

More specifically, in an embodiment there would be: (i) checksums in each summary packet sent by a node, (ii) a checksum run by each node on the integrated set of all change summary packets received by it, (iii) at an agreed time following mutual dissemination (again using the existing time synchronization asset present) each node then emits its value of the integrated change summary checksum value, and listens for that received in its input ports on all of its spans (iv) any node that hears a single non-agreeing checksum floods an "inconsistency alert," (v) nodes either issuing or hearing an inconsistency alert invoke suspension and cancellation of the entire process for the current time cycle, (vi) if at the end of the pre-allotted time for global exchange of confirmatory checksums, a node hears no "inconsistency alert" and has seen only repeated checksum values that agree with its own, then the next phase is entered.

Also, in an embodiment, these checksums and flags can be issued and conveyed between nodes either via SONET-type overhead byte channels, or embedded data communication channels (such as SONET DCC) over the transmission links themselves. More generally, however, any known form of data communications or signaling byte communications between nodes can be used. Even with the most extensive measures (as outlined) for ensuring global state data accuracy this would still happen in a few seconds. Ultimately, however implemented, the important outcome of this phase is that all nodes now have a global list of the new paths requested (and paths released) through the network as a whole, from the last accumulation period.

Phase 3: (Global Optimization) In an embodiment of the next phase all nodes locally and individually solve an instance of an optimal global incremental batch provisioning problem. Referring to FIGS. 8 and 9, this is illustrated at the node level in steps 46 and 66, respectively, as a solution is computed for configuring connections to provide channels at the node. The solution takes into account at least part of the change list accumulated at the node, including the connection requests accumulated at the node, and at least part of each of the change lists accumulated at the participating nodes. Referring to the method of FIG. 9, this step also includes computing the solution taking into account the departures recorded in the change lists from the node and the participating nodes. The channels may include, for example, working channels 30 and protection channels 32.

The compute step 46, 66 may in some embodiments be carried out in a cycle only if doing so would result in an improvement in resulting network performance as calculated by some performance measure, such as blocked or dropped connections for a given network load. Factors that might prevent an improvement in network performance include a failure at one or more nodes of the accumulate, dissemination or compute steps. Hence, if one such failure occurs, it may be assumed that carrying out the compute or implement steps for that cycle would not result in improved network performance and the compute and implement steps may be waived for that particular cycle.

The computational problem solved at this stage may be chosen by the network operator depending on network requirements. For example, the problem in one embodiment uses a globally optimal model. Various factors or constraints may be used in the computation. For example, the model may take advantage of any resource releases in the last phase, route the new working path requests, and re-optimize the overall protection plan for the new set of paths in service (as for example to ensure that for each working channel there is a protection channel), taking into account a variety of possible protection service classes. Optionally it can also either keep existing protection arrangements in place and just add the new ones, or globally reoptimize the configuration of protection resources for the entire set of paths in service. The key property of this process is that although computed locally at each node, on possibly different computing platforms, every node arrives at an identical solution in terms of working channel, spare channel, and path assignment details for the network as a whole. Any computational method that arrives at the same solution to the global reconfiguration problem, given the same global input data is sufficient. The computation is done in a way that every node locally obtains a solution that is identical in detail to that obtained at every other node starting with the same confirmed initial state and incremental change list.

If a check on whether solutions at the nodes are identical is desired, at the end of a pre-defined time allowed for solution of the global optimal reconfiguration problem, a checksum run on the solution can be disseminated for mutual confirmation of an identical solution having been arrived at by all nodes. This would use the same methods and logic as just described above to ensure global identicalness of the accumulated change request list above.

In the event that a node failed to complete the solution of its local instance of the global reconfiguration problem, by the predefined synchronization deadline for having completed solving the reconfiguration problem, or it publishes a checksum that mismatched others, the node is then diagnosed as having a control failure. It may then retain existing connections presently in place and simply not participate further in the ongoing provisioning change processes.

The postulated node-failure scenario is not particular to this scheme. It corresponds to the same node having a "brain failure" under present concepts of asynchronous GMPLS type provisioning operations. At best the node would simply stop being available to participate in further ongoing provisioning requests.

Various methods may be used to deal with how the scheme works when a failure arises. The failure will in general arise anachronously with the operation of the scheme for continual re-optimization and batch provisioning of new paths. Two examples follow.

Each node has a current and valid protection preplan on hand and may activate the plan immediately if a failure arises. The arrival of the failure and the protection response, however, amount to changes in the network state which were not shared by all in the network during the last disseminate phase. In general, this means that the next scheduled implement phase should be waived by sending a waive or hold off message to the participating nodes. The only hazard arises if the attempt to waive the pending activation step for the next network state at all nodes occurs within the worst-case time delay interval for flooding out a "hold off—no changes" message to all nodes. If this interval is (delta) seconds (typically under 100-milliseconds in practice) then the logic for any node that sees the onset of the failure can be:

If (time until next network-synchronous implement time >delta)

Go ahead and effect the protection response and simultaneously flood out "failure alert."

If (time until next network-synchronous implement time </=delta)

Defer reacting to the failure. Do not notify any node at the moment. Proceed with the implement step to the next network state.

At the start of the next Accumulate phase, activate the protection response and simultaneously flood out "failure alert."

With these considerations, the already described system operation will continue to work. To with: In the next accumulate and disseminate steps, the failure and the changes made for its protection will be inherently included in ongoing network reoptimization for the next time step. And if for some reason even during the disseminate stage following the failure and its response, the new network state was not stable and known correctly by all nodes then, the already given considerations about checksum failure apply so that the next compute/implement phase would be nullified and a further disseminate and global confirmation step would be needed before continuing.

In an embodiment, the time available for the local computation at each node is a large fraction of the basic cycle time chosen for the scheme, and it is overlapped with the next accumulation phase. For instance if the overall cycle is defined to start every 10 minutes, and 10 seconds is allowed for the change update dissemination, then 9 min, 50 sec is available for computation. However, in the next step some of the computation time may be used for cross-connection activation time.

Phase 4: (Local Activations to Effect Global Reconfiguration) On the onset of the next pre-defined time instant within the overall cycle, each node implements its part only of the global reconfiguration solution. Referring to FIGS. 8 and 9, this is illustrated at the node level in steps 48 and 68, respectively, as the computed solution is implemented at the node 20. The computed solution may be a unique solution of an optimization algorithm. The optimization algorithm may further be an integer linear programming model. In other words each node locally makes and releases all the cross-connections within its own local switch matrix which correspond to implementing its part (only) of the globally optimal incremental reconfiguration solution.

Referring to FIG. 1A, implementing the solution may comprise creating cross-connections at the node 20 between participating nodes 26. Implementing the solution may also comprise creating connections at the node 20 to source 22 and sink nodes (illustrated as 26A). This may include creating cross-connections that transit connections for paths between other end-nodes and creating connections at source and sink nodes which connect the new path to the local access port of the user of the respective path.

Once the cross-connections are made, the end-user of the service is then notified that the path is now in service and the end-node cross-connects and/or the end-user equipment, by their own time and measure can then validate the path integrity. In an embodiment, the global reconfiguration problem definition can assert that no existing path in service (that was not released in the prior accumulation period) is ever disconnected or rearranged in this change-activation stage. Optionally, if an operator elects (based on customer class or other consideration), some or all of the existing service paths may be re-arranged while in service as a part of the global reoptimization of network configuration. The latter gives scope for greater efficiencies in network resources usage. The cross-connection changes made at this phase follow the same pattern, either of strictly not touching connection paths in service or rearranging paths in service, as permitted. All of the steps of the methods disclosed herein may be carried out as a batch process in which the method steps are repeated. The method steps of succeeding batches may overlap each other.

After the implementation phase 4, a few seconds of guard-time can be invested, leading up to the instant at which the next accumulation interval will be ending, and the next change-request summary dissemination phase begins. The overall concept of operation 10 is shown on FIG. 1, in which the "*" reference sign indicates the precise-time instant.

In one embodiment of the method at least the step of implementing the computed solution is carried out at the node synchronously with the corresponding step or steps carried out at the participating nodes. In another embodiment, the step of implementing the computed solution is carried out at the node simultaneously with the corresponding step or steps carried out at the participating nodes. The step or steps in the two embodiments described above may refer, for example, to the implementing step. In other embodiments of the method, the method steps are carried out at the node synchronously with corresponding method steps carried out at the participating nodes. In further embodiments, the method steps are carried out at the node simultaneously with corresponding method steps carried out at the participating nodes.

Any number of desirable different approaches or policies for the incremental global re-optimization problem can be defined and all will work under this scheme. Examples include rearrangement policies with and without existing paths in service, multiple potential service class priorities, multiple protection classes of service, and use of algorithms or integer liner programming to define the re-optimization problem. In an embodiment following phase 4 above the new requested service paths are either in service or were not feasible in the recent network state and the format for notification to end customers provides this information using existing user-network interface protocols. In this framework customers also remain at liberty to use their own existing means for end-to-end confirmation of the requested path, for example using under GMPLS type signaling.

While one advantage is in showing a way for continual automated network operations without hazard from database incoherence, another advantage is that because it is a global batch reconfiguration problem that is solved, there are greater efficiencies obtained in the use of network resources. To show this, an example follows of the incremental batch re-optimization policy that would be used in an embodiment and show (by simulation studies), the added efficiencies of batch incremental provisioning over asynchronous individual arrival provisioning.

Example of an Incremental Optimal Batch Provisioning Model

In an implementation study we assumed connection requests arrive at random at each node, under standard memoryless Poisson arrival/departure assumptions and requires a working path routing and shared backup path protection for survivability. An Integer Linear Programming (ILP) model for optimal "green fields" design to serve a set of demands under SBPP is available from J. Doucette et al, "On the Availability and Capacity Requirements of Shared Backup Path-Protected Mesh Networks", SPIE Optical Networks Magazine, v. 4, no. 6, pp. 29-44, 2003, but other commercially available linear programming models may be used, that may be for example adapted to define an embodiment of the incremental batch reconfiguration problem given in Appendix A.

The model of Appendix A embodies the following main features that adapt it to the context of incremental re-optimized batch provisioning with pre-existing capacities and connections and protection arrangements already in service. When executed, the model takes into account (i) the set of all existing connections in progress that continue through to the next period (and are not disturbed at all), (ii) the set of all new connection requests to be served, and (iii) the new set of unused capacities on all links which includes any channels released by departures in the past operating period. It then allows for any desired relative emphasis on the simultaneous objectives of (i) maximizing the number of new demands served, (ii) minimizing the working resources allocated to new demands, and/or (iii) minimizing the total resources used for protection. Depending on relative weightings of parameters in the model, a range of operating policies from "serve new demands at all costs" ($\alpha=1$, $\beta=0$, $\gamma=0$) to "serve new demands but conserve capacity used for their routing" ($\alpha=1$, $\beta>0$, $\gamma=0$) to "serve new demands but only if it is not expensive to protect all demands in the new configuration" ($\alpha=1$, $\beta=0$, $\gamma>0$), and so on.

An addition feature of the incremental batch reconfiguration model is a choice as to whether a general re-optimization of all backup resources for protection is permitted or not. This is a reasonable and possibly powerful option in any survivable network because this only rearranges the assignments of spare capacity to implement the full level of protection desired. This does not imply that working paths are touched in any way, just the pre-plans for their protection may be either completely globally reoptimized, or left as is and only new paths backup arrangements optimized. The option to globally reoptimize backup paths at the time of an incremental batch provisioning update provides opportunities to release new operating capacity at each interval. It is not an option that can be as easily considered in the existing schemes of independent asynchronous arrival provisioning because each end node pair only controls the backup arrangements for their own paths and there is no single defined time at which an entire reoptimized backup plan could be globally adopted. In this scheme, however, global updates to the backup plan just become part of the new configuration data solved for by every node and "switched into" at the next global time tick.

Simulation of Incremental Optimal Batch Provisioning

To study and demonstrate the efficiency benefits of incremental optimal batch provisioning, a simulator was implemented with the aim of testing the behavior and performance of networks working according to this proposal. The complete simulator includes random connection arrival and departure generating process on each node pair, and the "change accumulation" process at each node. It then assumes the dissemination phase and uses an AMPL/CPLEX solver to determine the optimal solution of each successive incremental batch provisioning problem on the network as a whole. A series of experiments was carried out to demonstrate the benefits of the proposed mode of network operation. A few of these results are now presented.

Figure 2A:
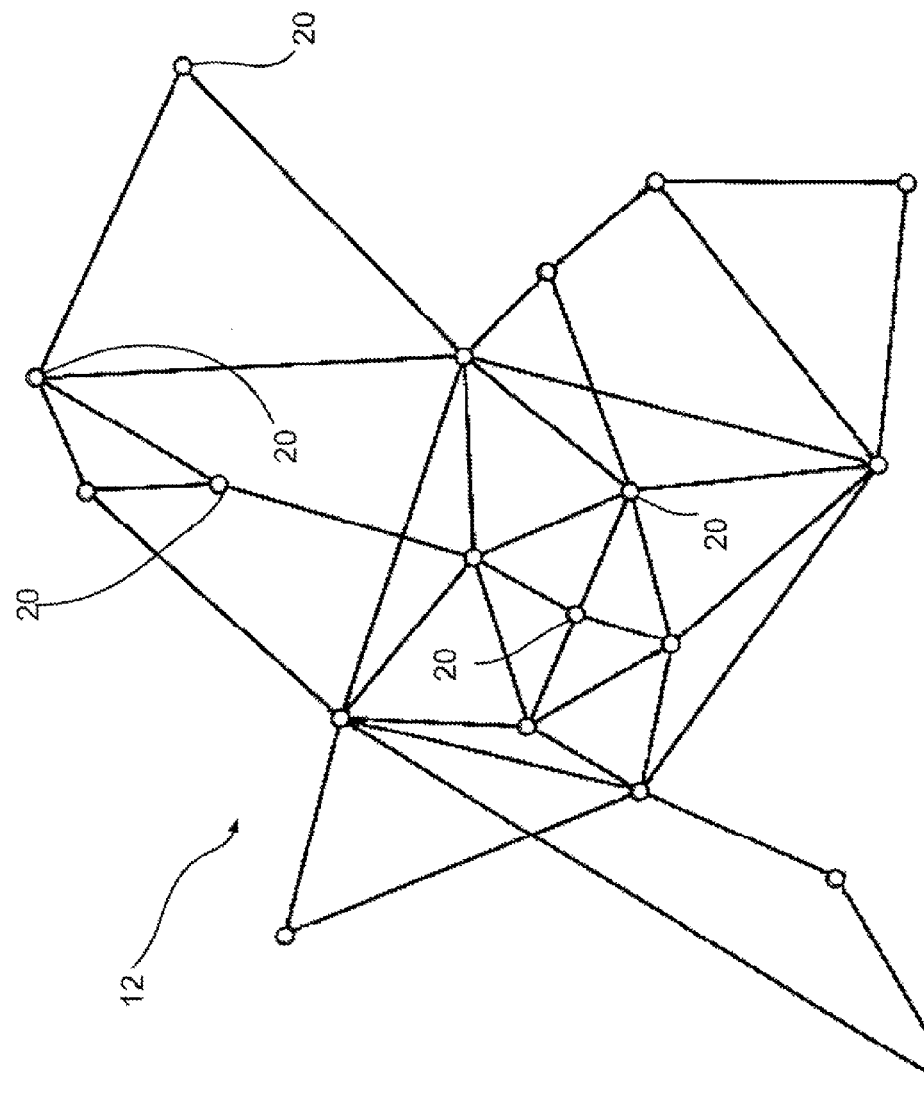
FIG. 2A illustrates a high degree (normal) EU network topology used in the experiments.

For the experiments a European WDM network topology and a sparser version of itself (obtained by deleting some links) were used, as shown in FIGS. 2A-B, respectively. Referring to FIG. 2A, the original network topology 12 has 19 nodes and 39 links (average node degree ~4.1). Referring to FIG. 2B, the sparser network topology 14 has 24 links (average node degree ~2.5). In the networks illustrated in FIGS. 2A, 2B, and 5, several of the nodes are arbitrarily labeled as nodes 20. Each link is assumed to have 4 wavelength channels, and full wavelength conversion capabilities are assumed at network nodes.

The offered traffic is generated either uniformly or in a spatial pattern of intensity on each node pair with a Poisson arrival process. Connection holding times are exponentially distributed with a mean of one time unit so the arrival rate can be varied directly and the offered network load per node pair in Erlangs is numerically the same as the arrival rate.

Figure 3:
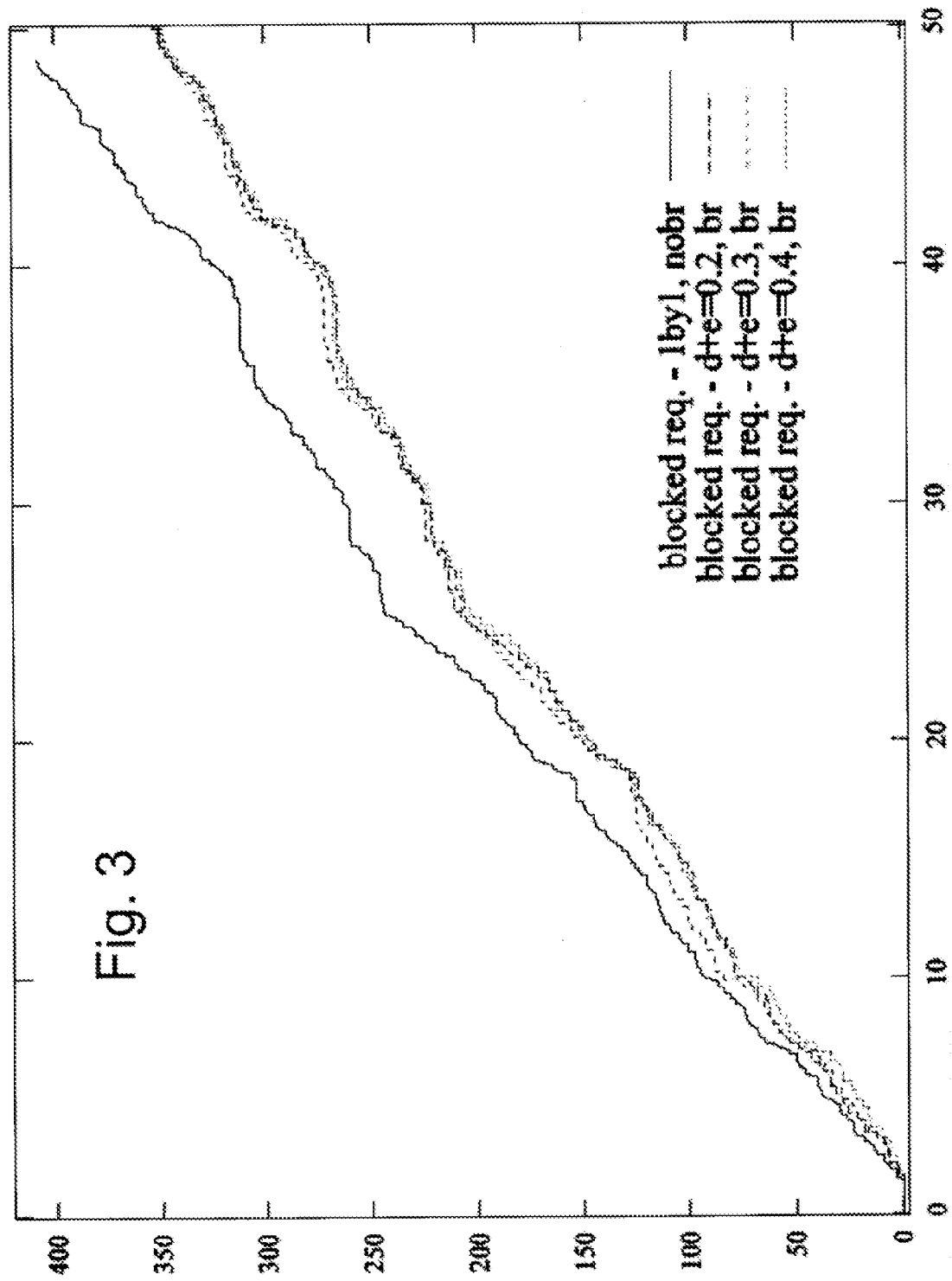
FIG. 3 illustrates a number of blocked demands versus time in normal and sparse topologies under asynchronous individual provisioning and batched optimal provisioning with various accumulation intervals.
Figure 6:
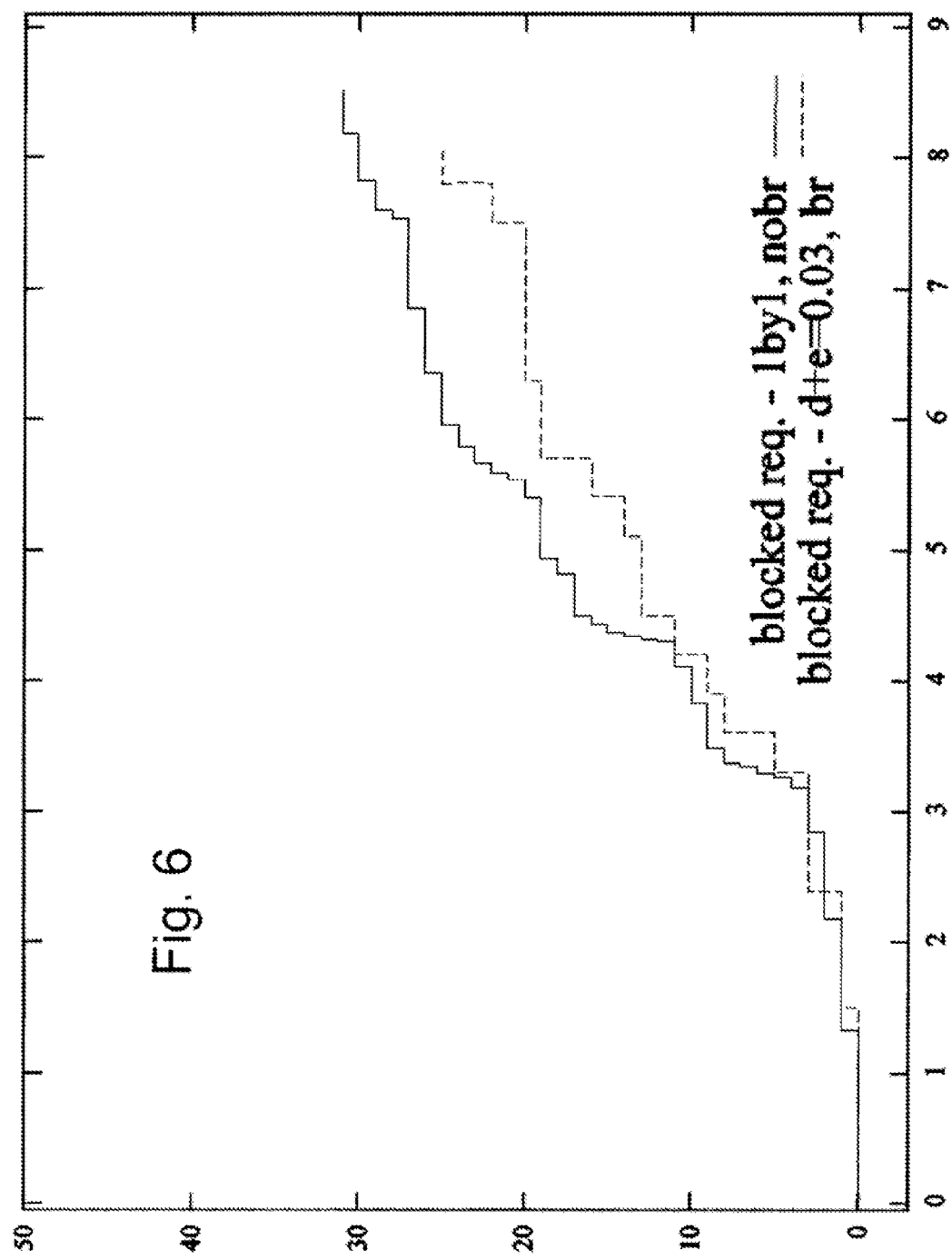
FIG. 6 illustrates the spatial load drift experiment in the normal topology.
Figure 7:
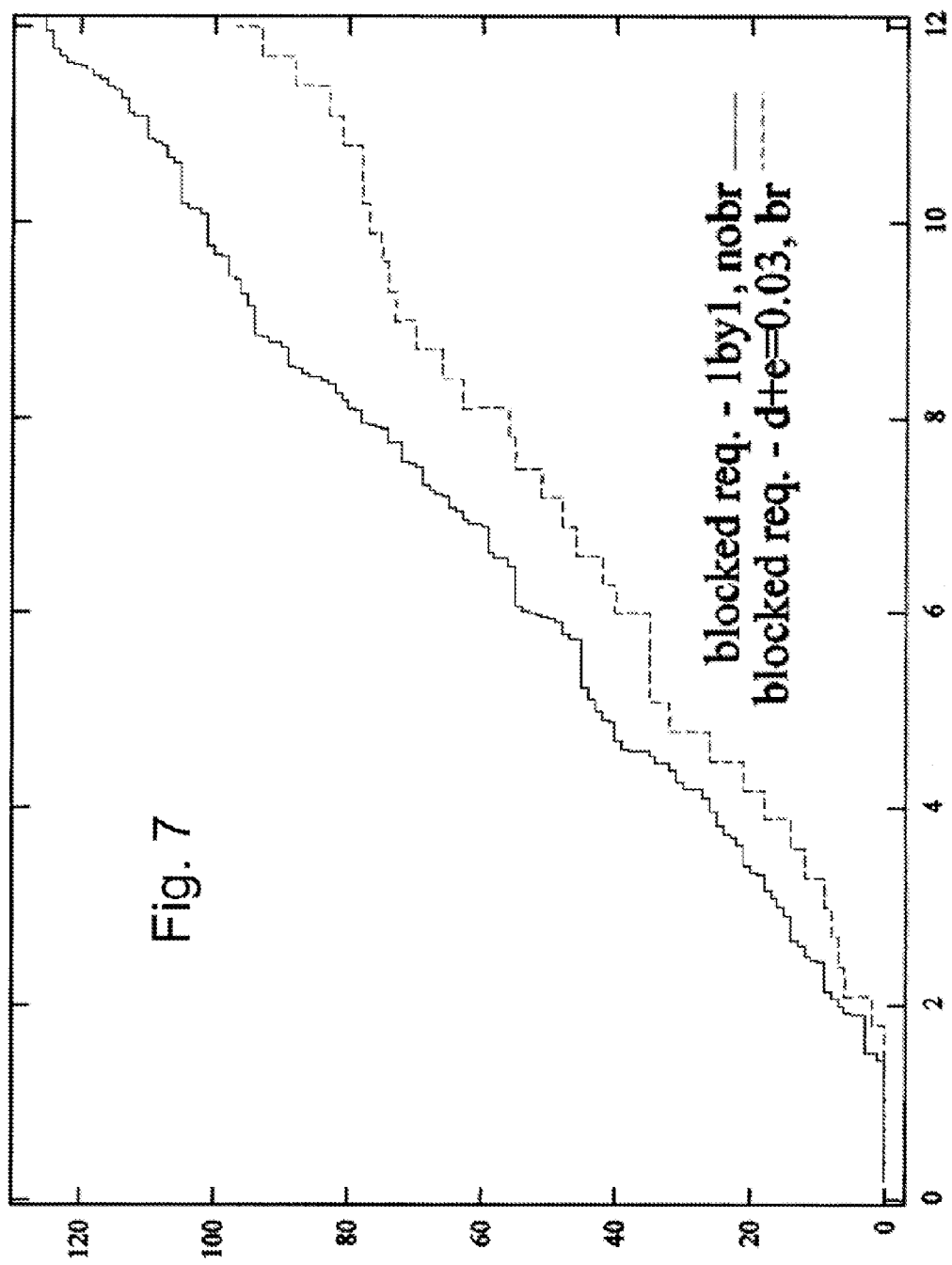
FIG. 7 illustrates the spatial load drift experiment in the sparse topology.

In a first set of trials, load was uniform on all node pairs, to simulate ongoing network operation under a constant moderate load. The benefits of incremental batch provisioning were particularly evident in the sparse network. FIG. 3 shows the results in the sparse topology at 22 Erl (total network load). To appreciate the test circumstance more intuitively, this means that there are ~22 paths in service in the network on average and they and their shared backup protection paths are all supported over the four channels on each edge. FIG. 3 and the other FIGS. 4, 6 and 7 of this type show the total count of connection blocking events through the simulation time. The solid line represents blocking under one-by-one handling of arrivals. The other lines represent the blocking total history of batch incremental provisioning with the accumulation interval varying from 0.2 to 0.4 of the average connection holding time and the option to re-optimize protection sharing relationships at each stage. The benefit seems especially visible in the sparse topology where routing decisions are in a sense more critical to get right if the network performance is to be its best.

Another scenario when incremental batch provisioning is expected to perform better is when the network has to handle changes in the statistical parameters of the load pattern. Two types of such changes may be imagined for test cases: (1) evenly distributed connection demands, temporary increase in arrival rate and (2) temporary change in spatial distribution of connection demands, constant arrival rate.

Under a temporary but spatially uniform "overload" situation, the benefits of incremental batch provisioning are illustrated in a test case where we simulated all nodes undergoing the same Erlang load intensity involving a temporary general overload. In this simulation the overall load was a baseline of 15 Erlangs for eight time steps, in the middle of which for two time periods the load increased to 120 Erlangs. The purpose of the experiment is to test the reaction to a temporary overload, under batch provisioning compared to individual provisioning. FIG. 3 shows that under the baseline of 15 Erl, neither approach is blocking. Then, when the intense overload begins, blocking counts start rising steeply, but by the time the whole transient has passed, batch handling with re-optimization at each step resulted in significantly greater load carrying ability in the network through the transient.

Figure 4:
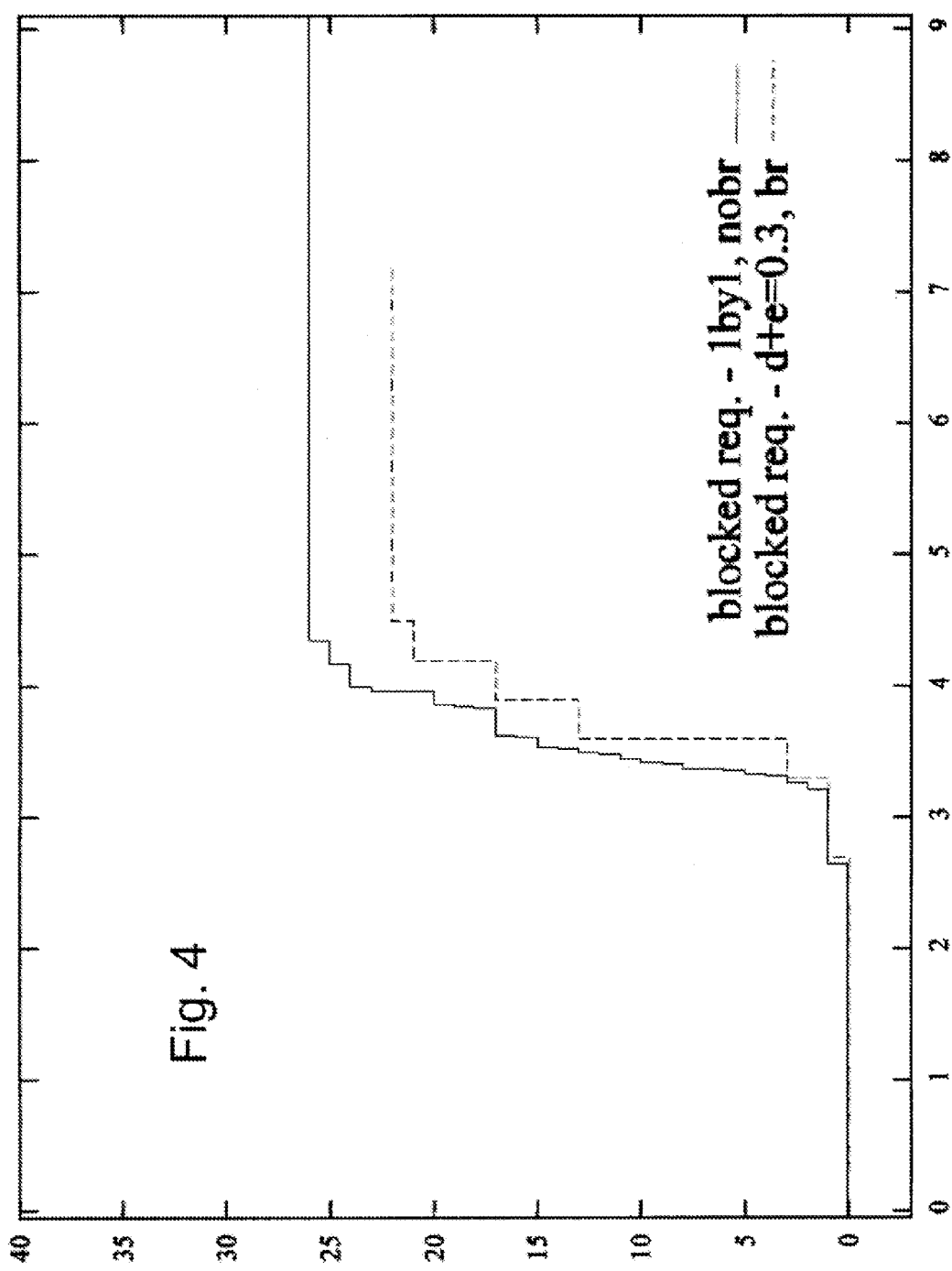
FIG. 4 illustrates the performance of incremental batch provisioning in the normal topology under temporary load increase.

Next, to simulate a spatial as well as temporal dynamic evolution in demand we forced modulated the pair-wise arrival rates individually as follows. The total connection arrival rate on the network as a whole remains constant but in end node pairs are grouped into certain spatial orientations and the load on these groups is time-varying. For example, in FIG. 5 "northern" nodes have an arrow that points downwards, while southern nodes have an arrow pointing upwards, and a node-pair in the North-South group has one end node from each set. To illustrate FIG. 4 shows the N-S and E-W spatial groupings as defined for tests in the normal topology.

Figure 5:
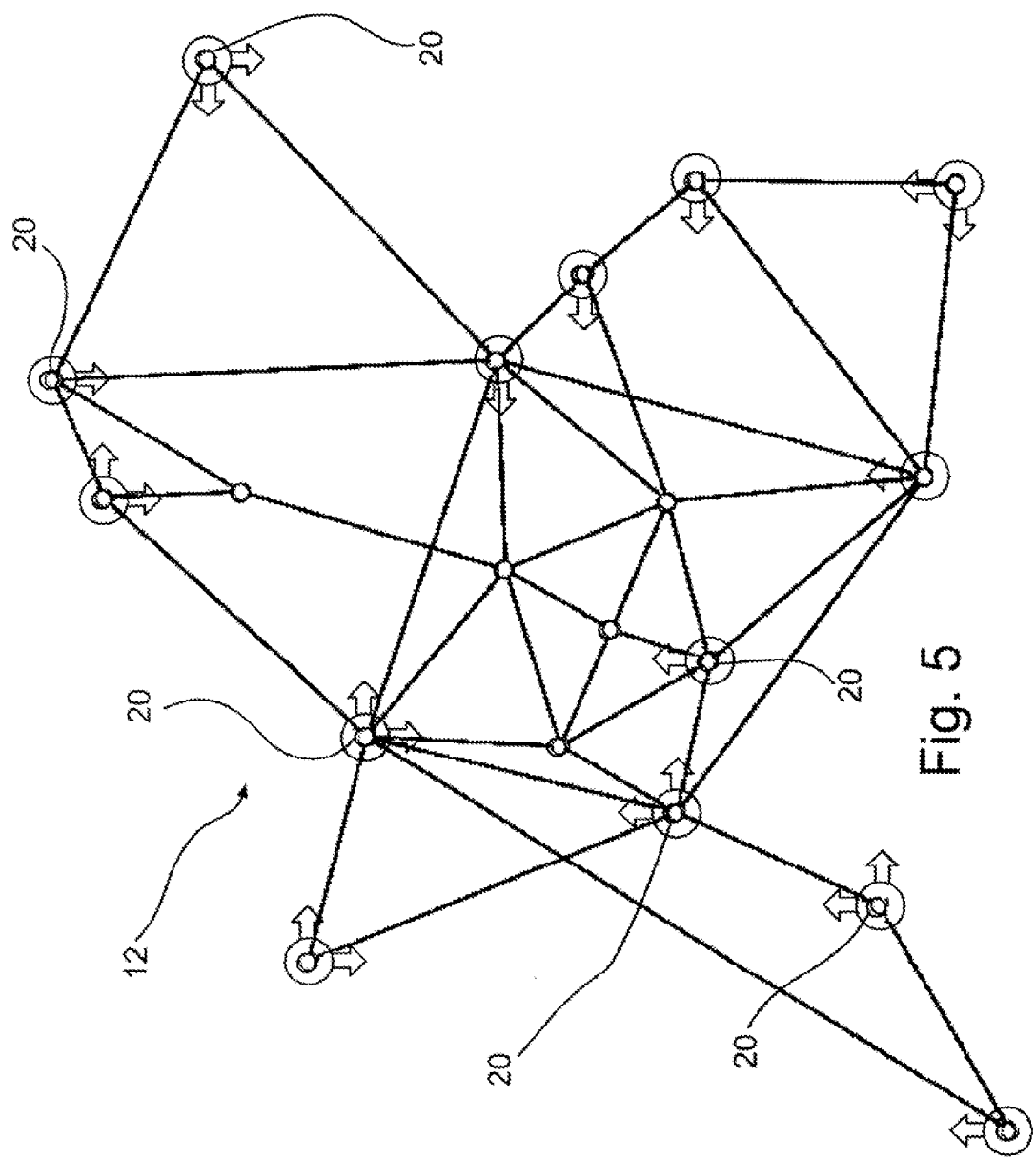
FIG. 5 illustrates switched directional constraints on load used to simulate spatial transient evolution of demand pattern in the experiments.

FIG. 5 shows the results of a spatial load evolution experiment carried out in the normal topology with a total load of 30 Erl which is "switched" to flowing in three distinct patterns through the experiment: [0-3]=even, [3-3.5]=North-South, [3.5-4]=East-West, [4-]=even. FIG. 5 shows the superior ability of batch incremental provisioning to adapt to the time-and-space evolution of the demand pattern. The differences are even greater in the sparser topology.

Discussion

What has been disclosed is a new framework or method for network operations in the face of continually randomly arriving requirements for protected (or non-protected) connections through a transport network. Like current "peer-to-peer" GMPLS-based concepts for dynamic service provisioning, this scheme is also without any dependence on centralized network control, but has the following further advantages: (i) critical data dissemination and/or database synchronization does not occur under real-time pressure, (ii) no data dissemination or state update occurs except at predefined times, in a summarized way, with robust error detection, (iii) groups of path change requests (new arrivals and departures) are taken into effect as a group and their treatment optimized. (iv) if backup reconfiguration is permitted, at each step even greater efficiency gains are possible by re-optimizing and reconfiguring the protection capacity planning at each step.

Results show that efficiencies and performance gains can be made with the batch incremental optimization approach, especially in sparse topologies facing an uncertain time-space demand pattern. The price to access the benefits of eliminating the data-base hazard and realizing the added efficiencies and adaptability shown above is (i) the acceptance of a dynamic service offering model where there is a small delay in realizing provisioning requests at the transport path level, or such requests are pre-scheduled, and (ii) determination of suitable techniques for solving instances of the global optimization problem so that on every platform the outcome is not just equivalent but identical at the level of detail needed to correctly assign port numbers and so on to correctly realize the end-to-end paths.

An engineer of ordinary skill in the art might ask "How critical is the time synchronization accuracy?" There are two places in FIG. 1 where we have indicated that time-synchronous actions at nodes are intended. One is in closing off the accumulation intervals. Ideally, this happens at the same absolute time at all nodes, so that the next state the network enters reflects exactly the set of new provisioning requests that arrived at nodes over the same preceding intervals of the networks life. However, the perfect simultaneity of this event at all nodes is not actually required, because request (or release) events pertaining to a node-pair actually arrive at only one of the two nodes in the pair. Therefore even if the interval closes early or late at one node with respect to another, the worst-case effect is only that a new service request may have to wait until the next interval to be provisioned. More generally, a spread of the exact times of internal events at nodes of even a few microseconds (as would be obtained for "free" simply from existing time synch in the network) is not a serious impediment, because this time is still so vanishingly small compared to the holding time of connections or the interarrival time of new connection requests. And, overriding everything is the consideration that nodes will not proceed to make any actual network changes until the positive indication of coherent global state is confirmed everywhere. Therefore, delay of event handling into the next cycle is strictly possible, but deleterious wrongful uncoordinated changes on the network by asynchronously acting nodes should not happen in this scheme.

The other point in the cycle where time precision is desirable, but again not actually crucial (in the sense that things would fail otherwise), is the instant at which each node puts its own local cross-connections into service. If these actions are simultaneous everywhere, then the new paths in service appear to form more instantly, in parallel. But a spread of exact times of cross-connect completion of a few microseconds is also of no practical concern. One aspect in which the precision could be argued to be of technical concern is when the protection arrangements have been re-optimized in the preceding computation phase and are now to be put into effect in conjunction with activating the new service paths as well. Here, if one node is acting say 1 millisecond behind the others, then there could be a 1 millisecond gap in protection coverage of some existing or new paths. In practice, however, this is a trivial amount of unprotected time and familiarity with the level of precise time accuracy available in today's network actually suggesting that the worst-case coverage gap due to this consideration is more like microseconds, not milliseconds.

Another question from an engineer skilled in the art could be based on recognizing that different nodes might not all use the same computing infrastructure, so it might not always be assured that even with identical input data, and an identical problem statement, that the reconfiguration solution at each node would be identical in details to that at other nodes. (There may be solutions which are equivalent in "cost" but not identical in that they all pertain to a different detailed assignment of ports, wavelengths, time-slots, etc.) An embodiment can address this possible concern, however, in any one of several ways. First all nodes may indeed be required to have the same CPU types. If not the same CPU types, they may be required to run identical software (for instance FORTRAN implementations have been standardized by IEEE in a way that requires identical numerical behaviors on any compliant platform.) Another approach is even available at the level of the optimization model definition itself: by adding uniqueness-forcing details to the problem definition (for example adding a second objective function term to be minimized which is the product of a small number and the sum of all channel and port numbers used in the solution). Another method is the addition of unique dithering noise on cost coefficients in the problem model or use of systematic port numbering schemes at nodes. Another simple approach, if needed, is that if multiple "cost equivalent", but not identical, solutions exist, then a checksum can be run, the sum of all identity number of channels and ports employed, and the convention adopted that all nodes select that with the lowest checksum.

In a further embodiment within the spirit of this framework, the uniqueness restraint may be relaxed and the network computing power used so as to explore the search space more efficiently. In this context, each node would compute a solution and those solutions would be disseminated to the other nodes, each node keeping the best solution. In another embodiment, a single proven implementation in a high level language run on all nodes would even be a suitable solution in practice. An engineer skilled in the art would understand that there are numerous ideas and approaches to the identical computation problem and even straightforward solutions may be acceptable. The overall scheme does not thus seem to encounter any "show-stoppers" on this account.

This document discloses research on entirely new ideas about how to operate communication networks. It is hoped that the information contained herein is seen as contributing ideas towards that end, even though many may disagree at present with notions such as batch provisioning with a slight user delay for lightpaths, or the computational power to solve ILP models in each node as opposed to centrally, and so on. In addition, space has limited simulation results of the adaptability and resource efficiency to only two network cases, but this suffices to illustrate that benefits exist. In some embodiments, the methods and systems disclosed herein may be applied to a wider range of network, traffic, and batching scenarios. In adapting the framework of this system to various embodiments, a worker skilled in the art would understand that many detail changes may be required, which are within the scope of the teachings of this document. In another embodiment, the system and methods disclosed herein may be use to operating an entire communication network as a single large (clocked) digital logic circuit, from a control configuration standpoint.

In any given embodiment, engineers skilled in the art in general, reading this disclosure will understand the significance of the solutions at all nodes being identical, not just equivalent, and if the select one of these methods, if indeed any, happens to be needed at all (some optimization models may be inherently single-optimum) that from other points of view is the least costly or simplest to use to ensure this property.

The framework that permits distributed effectively self-organizing, but optimal, re-optimization of the network state is quite general and supports operation of a number of different network types and operational goals. For instance, the method is mainly described for provisioning and protecting new paths through an optical network, but it could also apply to routing tables in a connection less data network or label switched paths in an MPLS- or Ethernet type network. It also encompasses any type of policy for routing of new working paths, any type of protection strategy, and any type of rearrangement policy that can be expressed in an algorithm or optimization model at each node. Specifically it could also be applied to wavelength assignment in optical networks or reoptimization of "protected working capacity envelope" shapes and/or to network plans for dual-failure survivability, or multicast routing.

Appendix A: Incremental Batch Reoptimization Model Used in the Experiments

Formulation for single priority incremental batch change optimization with SBPP protection adapted from the static optimization model for SBPP in Doucette et al cited above as one example only of the type of global reconfiguration problem model that can be used as the basis for ongoing operation of a dynamic network.

```
#SETS
    set LINKS;
    set PATHS;
    set LINKS_OF {PATHS} within LINKS; # set of demands already in the network
    set D_OLD; # set of new demands
    set D_NEW; # sets of links of working lightpaths of demands already in the
network
    set W {D_OLD} within LINKS; # set of backup path candidates for demands
already in the network
    set B {D_OLD} within PATHS; # set of (working, backup) candidate pairs for
new demands
    set WB {D_NEW} within {PATHS, PATHS}; # free capacity on links
    #PARAMETERS
    param S {LINKS}; # mapping function between opposite links
    param OPPOSITE {LINKS}; # weight of number of total new demands served in
the cost function
    param ALPHA default 1; # weight of working resources allocated to new
demands in the cost function
    param BETA default 0; # weight of total allocated backup resources in the cost
function
    param GAMMA default 0;
    #VARIABLES
    # X[d,b] binary decision variable:
    # 1, if old demand d uses backup path b, 0 otherwise
    var X {d in D_OLD, B[d]} binary;
    # Y[d,w,b] binary decision variable:
    # 1, if new demands d uses (w,b) working-backup path pair, 0 otherwise
    var Y {d in D_NEW, WB[d]} binary;
    # OBJECTIVE FUNCTION
    maximize Total_served_minus_resources:
    ALPHA * (sum {d in D_NEW, (w,b) in WB[d]} Y[d,w,b]) – BETA * (sum {d in
D_NEW, (w,b) in WB[d]} Y[d,w,b] * card(LINKS_OF[w])) – GAMMA * (sum {i in
LINKS, j in LINKS: i <> j and i <> OPPOSITE[j]} (sum {d in D_OLD, b in B[d]: (i in
W[d] or OPPOSITE[i] in W[d]) and j in LINKS_OF[b]} X[d,b] + sum {d in D_NEW,
(w,b) in WB[d]: (i in LINKS_OF[w] or OPPOSITE[i] in LINKS_OF[w]) and j in
LINKS_OF[b]} Y[d,w,b])) / (card(LINKS) – 2);
```

```
#CONSTRAINTS
# constraint 1: each old demand must have exactly one backup path
subject to Served {d in D_OLD}: sum {b in B[d]} X[d,b] = 1;
# constraint 2: each new demands may use at most one eligible working-backup path pair
subject to At_most_one {d in D_NEW}: sum {(w,b) in WB[d]} Y[d,w,b] <= 1;
# constraint 3: the capacity used on link j if link i fails must not exceed S[j]
subject to Cap_share {i in LINKS, j in LINKS: i <> j and i <> OPPOSITE[j]}:
    sum {d in D_OLD, b in B[d]: (i in W[d] or OPPOSITE[i] in W[d]) and j in LINKS_OF[b]} X[d,b] + sum {d in D_NEW, (w,b) in WB[d]: j in LINKS_OF[w]} Y[d,w,b] + sum {d in D_NEW, (w,b) in WB[d]: (i in LINKS_OF[w] or OPPOSITE[i] in LINKS_OF[w]) and j in LINKS_OF[b]} Y[d,w,b] <= S[j];
#end
```

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims. Immaterial modifications may be made to the embodiments described here without departing from what is covered by the claims. A method of configuring a network may include any logical combination of the claims.

What is claimed is:

1. A method of configuring connections of a node in a telecommunications network with participating nodes of the telecommunications network, the method comprising the steps of:
    accumulating a change list at the node, the change list comprising connection requests received at the node;
    disseminating the change list to the participating nodes of the network;
    receiving, at the node, change lists from each of the participating nodes, the change list of each participating node comprising connection requests accumulated at the respective participating node;
    computing a solution for configuring connections to provide channels at the node that takes into account at least part of the change list accumulated at the node, including the connection requests accumulated at the node, and at least part of each of the change lists accumulated at the participating nodes, including connection requests accumulated at the participating nodes; and
    implementing at least a part of the computed solution at the node by changing connections at the node synchronously according to an absolute clock time with the corresponding step carried out at the participating nodes;
    wherein the method steps are carried out as a batch process in which the method steps are repeated.

2. The method of claim 1 in which the channels comprise working channels and protection channels.

3. The method of claim 2 in which the solution is a unique solution of an optimization algorithm.

4. The method of claim 2 in which the method steps are carried out at the node synchronously with corresponding method steps carried out at the participating nodes.

5. The method of claim 4 in which implementing the solution comprises modifying cross-connections at the node between participating nodes.

6. The method of claim 2 in which the method steps are carried out at the node simultaneously with corresponding method steps carried out at the participating nodes.

7. The method of claim 6 in which implementing the solution comprises modifying connections at the node to source and sink nodes.

8. The method of claim 1 in which: the change list accumulated at the node further comprises departures recorded at the node while accumulating the change list;
    each change list accumulated at the participating nodes further comprises departures recorded at the respective participating node while accumulating the change list at the respective participating node; and
    computing a solution at the node takes into account the departures recorded at the node and at the participating nodes.

9. The method of claim 8 in which the optimization algorithm is an integer linear programming model.

10. The method of claim 1 in which computing the solution at the node comprises computing a network connection solution for all participating nodes.

11. The method of claim 1 in which the accumulate and disseminate steps are carried out in repeated cycles by the node and each of a compute step and an implement step is carried out in a cycle at the node depending on whether one or more preceding steps of the cycle satisfy one or more checks on the integrity of the one or more preceding steps.

12. The method of claim 11 in which computing the solution at the node comprises computing a network connection solution for all participating nodes.

13. The method of claim 12 in which each of the participating nodes computes a network connection solution, and the one or more checks comprise ascertaining whether the network connection solutions are identical.

14. The method of claim 11 in which the one or more checks comprise detecting a solution failure at the node or at a participating node.

15. The method of claim 11 in which the one or more checks comprise the steps of:
    integrating change lists received from the participating nodes;
    generating an integrity measure corresponding to the integrated change lists;
    receiving an integrity measure from each of the participating nodes that is indicative of
    integrated change lists at each respective participating node; and
    checking whether the integrity measures are identical.

16. The method of claim 1 further comprising:
    each of the participating nodes computing a network connection solution;
    ascertaining whether the network connection solutions are identical; and selecting one of the network connection solutions of the node and the participating nodes for implementation.

17. The method of claim 1 in which computing a solution is subject to a constraint of providing a protection channel for each working channel as a factor.

18. A method of configuring connections of a node in a telecommunications network with participating nodes of the telecommunications network, the method comprising the steps of:
- accumulating a change list at the node, the change list comprising connection requests received at the node;
- disseminating the change list to the participating nodes of the network;
- receiving, at the node, change lists from each of the participating nodes, the change list of each participating node comprising connection requests accumulated at the respective participating node;
- computing a solution for configuring connections to provide channels at the node that takes into account at least part of the change list accumulated at the node, including the connection requests accumulated at the node, and at least part of each of the change lists accumulated at the participating nodes, including connection requests accumulated at the participating nodes; and
- implementing at least a part of the computed solution at the node by changing connections at the node;
- wherein the method steps are carried out as a batch process in which the method steps are repeated; and
- wherein the method steps of succeeding batches overlap each other.

19. A method of configuring a telecommunications network having nodes, the method comprising the steps of:
- participating nodes cyclically accumulating and sharing information on requested connections at the participating nodes, the cyclical accumulating and sharing of information being carried out as a batch process; and
- each node of the participating nodes computing and locally implementing a connection configuration at the respective node when implementing the connection configuration would improve network performance;
- wherein the step of locally implementing the connection configuration is carried out at the node synchronously according to an absolute clock time with the corresponding step carried out at the participating nodes.

\* \* \* \* \*